(12) United States Patent
Gao et al.

(10) Patent No.: US 10,812,239 B2
(45) Date of Patent: Oct. 20, 2020

(54) METHOD AND APPARATUS FOR INFORMATION REPORTING, AND METHOD AND APPARATUS FOR INFORMATION TRANSMISSION

(71) Applicant: ZTE Corporation, Shenzhen, Guangdong (CN)

(72) Inventors: Bo Gao, Guangdong (CN); Yu Ngok Li, Guangdong (CN); Yijian Chen, Guangdong (CN); Zhaohua Lu, Guangdong (CN); Yifei Yuan, Guangdong (CN); Xinhui Wang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/207,077

(22) Filed: Nov. 30, 2018

(65) Prior Publication Data
US 2019/0207722 A1 Jul. 4, 2019

Related U.S. Application Data

(63) Continuation of application No. PCT/CN2018/096524, filed on Jul. 20, 2018.

(30) Foreign Application Priority Data

Aug. 11, 2017 (CN) .......................... 2017 1 0687945

(51) Int. Cl.
*H04L 5/00* (2006.01)
*H04B 7/06* (2006.01)
*H04W 24/10* (2009.01)

(52) U.S. Cl.
CPC ........... *H04L 5/005* (2013.01); *H04B 7/0626* (2013.01); *H04L 5/0048* (2013.01); *H04W 24/10* (2013.01)

(58) Field of Classification Search
CPC ..... H04W 24/10; H04B 7/088; H04B 7/0626; H04B 7/0695; H04L 5/0048; H04L 5/005
See application file for complete search history.

(56) References Cited

U.S. PATENT DOCUMENTS

2013/0114536 A1* 5/2013 Yoon ................. H04W 72/0466
370/329
2013/0288730 A1* 10/2013 Gomadam ............ H04W 24/00
455/509

(Continued)

FOREIGN PATENT DOCUMENTS

CN 104980247 A 10/2015
CN 105531944 A 4/2016

(Continued)

OTHER PUBLICATIONS

Chinese Office Action dated Dec. 25, 2019 for Chinese Patent Application No. 201710687945.9, filed on Aug. 11, 2017 (16 pages).

(Continued)

*Primary Examiner* — Brian D Nguyen
(74) *Attorney, Agent, or Firm* — Perkins Coie LLP

(57) ABSTRACT

A method and apparatus for information reporting as well as a method and apparatus for information transmission are provided. The method for information reporting includes: receiving, by a second communication node, a reference signal from a first communication node, to determine a reference signal-related index and/or channel state information; reporting, by the second communication node, a set to the first communication node, and the set includes at least one of: the reference signal-related index and the channel state information. This technical solution solves the problems of low flexibility and poor adaptability of beam-related information reporting in the related art; the second communication node reports its own capability, so that the first (Continued)

communication node can indicate a beam reporting that meets to user capability, thereby improving the stability of beam-related information reporting.

16 Claims, 7 Drawing Sheets

(56) References Cited

U.S. PATENT DOCUMENTS

| | | | |
|---|---|---|---|
| 2016/0352489 A1* | 12/2016 | Yoon | H04L 5/0051 |
| 2017/0026100 A1 | 1/2017 | Wang et al. | |
| 2017/0250745 A1* | 8/2017 | Athley | H04L 5/0048 |
| 2017/0331670 A1* | 11/2017 | Parkvall | H04L 41/0816 |
| 2018/0049149 A1* | 2/2018 | Lee | G01S 5/0205 |
| 2018/0102817 A1 | 4/2018 | Park et al. | |
| 2018/0123654 A1* | 5/2018 | Park | H04B 7/0456 |

FOREIGN PATENT DOCUMENTS

| | | |
|---|---|---|
| CN | 106716902 A | 5/2017 |
| CN | 108111278 A | 6/2018 |
| WO | 2015/154283 A1 | 10/2015 |
| WO | 2016/163843 A1 | 10/2016 |

OTHER PUBLICATIONS

Ericsson, "UL beam management details," 3GPP TSG-RAN WG1 #89ah-NR, Qingdao, China, R1-1711016, 3 pages, Jun. 2017.

Ericsson, "UL MIMO procedures for codebook based transmission," 3GPP TSG-RAN WG1 #89ah-NR, Qingdao, China, R1-1711008, 8 pages, Jun. 2017.

Extended Search Report dated Nov. 7, 2019 for European Application No. 18843995.4, filed on Jul. 20, 2018 (13 pages).

International Search Report and Written Opinion dated Sep. 29, 2018 for International Application No. PCT/CN2018/096524, filed on Jul. 20, 2018 (9 pages).

Zte, et al., "Details of UL beam management," 3GPP TSG RAN WG1 Meeting NR#3, Nagoya, Japan, R1-1715446, 5 pages, Sep. 2017.

* cited by examiner

METHOD AND APPARATUS FOR INFORMATION REPORTING, AND METHOD AND APPARATUS FOR INFORMATION TRANSMISSION

CROSS REFERENCE TO RELATED APPLICATIONS

This patent document is a continuation of and claims priority to International Patent Application No. PCT/CN2018/096524, filed on Jul. 20, 2018, which claims priority to Chinese Patent Application No. 201710687945.9, filed on Aug. 11, 2017. The entire contents of the before-mentioned patent applications are incorporated by reference as part of the disclosure of this application.

TECHNICAL FIELD

The present disclosure relates to communication field, more particularly to a method and apparatus for information reporting as well as a method and apparatus for information transmission.

BACKGROUND

Among related art, Ultra-Wideband and High-Frequency (UWHF), i.e., millimeter-wave communication, has become an important direction of development for future mobile communications, attracting much attention in academic and industrial circles around the world. In particular, the advantages of millimeter-wave communication have become more and more attractive with the increasingly congested spectrum resources and heavily accessed physical networks. In many standards organizations such as IEEE and 3GPP, standardization work has begun. For example, in 3GPP standards, high-frequency communication will become an important innovation point of 5G New Radio Access Technology (New RAT) due to its significant advantages of high bandwidth.

However, high-frequency communication also faces the challenge of link attenuation, which more specifically includes high propagation path loss, greater atmospheric absorption (especially oxygen), and heavy rain attenuation. Faced with these challenges, high-frequency communication systems can take advantage of the shorter wavelengths and easier antenna integration, and achieve a high antenna gain and counter signal transmission loss through multi-antenna array and beamforming schemes, to ensure link margin and improve communication robustness.

The training of antenna weights (i.e., precoding or beams) includes a high-frequency transmitting end sending a training pilot, and a receiving end receiving the signal and performing channel estimation. Then the high-frequency receiving end reports Channel State Information (CSI) to the end for transmitting the training pilot, so that the transmitting and receiving ends can determine a plurality of antenna weight pairs from candidate antenna weight pairs that are required for multipath data transmission, thereby improving spectral efficiency.

In millimeter-wave communication systems of the related art, beam-related information feedback includes a plurality of beam numbers and corresponding channel qualities under a maximum channel quality (e.g., SINR, or RSRP), for generating corresponding beam pairs for data transmission. However, beam receiving and beam transmitting capabilities are different between different user or base station characteristics; beam receiving and beam transmitting characteristics are different between different physical panels. Additionally, device movement and user selection may only require a portion of the beams to be updated. Methods in the related art can only report a maximum of a limited number of beams, but cannot flexibly support beam measurement and grouping, and beam tracking and state reporting between different types of UEs and different transmission requirements.

No prior art solutions provide a method for beam-related information reporting that supports multiple types of base stations and user capabilities and scenarios.

Currently there is no effective solution that could solve the problems of low flexibility and poor adaptability of beam-related information reporting in the related art.

SUMMARY

A method and apparatus for information reporting, and a method and apparatus for information transmission are provided according to embodiments of the present disclosure, to solve at least the problems of low flexibility and poor adaptability of beam-related information reporting in the related art.

A method for information reporting is provided according to an embodiment of the present disclosure, which includes: receiving, by a second communication node, a reference signal from a first communication node, to determine a reference signal-related index and/or channel state information; and reporting, by the second communication node, a set to the first communication node, wherein the set includes at least one of: the reference signal-related index and the channel state information.

A method for information transmission is also provided according to an embodiment of the present disclosure, which includes: determining, by a second communication node, reference signal resource-related information to be sent to a first communication node; and transmitting the related information to the first communication node.

An apparatus for information reporting is provided according to another embodiment of the present disclosure, which is applicable at a second communication node and includes: a first receiving module, configured to receive a reference signal from a first communication node, to determine a reference signal-related index and/or channel state information; and a reporting module, configured to report a set to the first communication node, wherein the set includes at least one of: the reference signal-related index and the channel state information.

An apparatus for information transmission is provided according to another embodiment of the present disclosure, which is applicable at a second communication node and includes: a determining module, configured to determine reference signal resource-related information to be sent to a first communication node; and a first transmitting module, configured to transmit the related information to the first communication node.

An apparatus for information reporting is provided according to another embodiment of the present disclosure, which is applicable at a first communication node and includes: a second transmitting module, configured to transmit reference information to a second communication node, wherein the second communication module determines a reference signal-related index and/or channel state information according to the reference signal; and a second receiving module, configured to receive a set reported by the second communication node, wherein the set includes at least one of: the reference signal-related index and the channel state information.

A storage medium is provided according to another embodiment of the present disclosure, which has a program stored thereon, wherein the program when executed performs any one of the methods according to the alternative embodiments above.

A processor is provided according to another embodiment of the present disclosure, for executing a program, wherein the program when executed performs any one of the methods according to the alternative embodiments above.

According to the present disclosure, the second communication node receives a reference signal from a first communication node, to determine a reference signal-related index and/or channel state information; the second communication node reports a set to the first communication node, where the set includes at least one of: the reference signal-related index and the channel state information. This technical solution solves the problems of low flexibility and poor adaptability of beam-related information reporting in the related art; the second communication node reports its own capability, so that the first communication node can indicate a beam reporting that meets to user capability, thereby improving the stability of beam-related information reporting.

BRIEF DESCRIPTION OF THE DRAWINGS

The accompanying drawings, which are incorporated herein and constitute a part of the specification, illustrate embodiments of the present disclosure. The exemplary embodiments and descriptions thereof are set forth by way of illustration and shall not be construed as limiting the scope of the present disclosure.

DETAILED DESCRIPTION

Embodiments of the present disclosure provide a mobile communication network (including but not limited to 5G network), the network structure of the network may include a network-side device (e.g., base station) and a terminal. According to an embodiment, a method for information transmission operable on the network structure is provided. It should be noted that the method according to the embodiment may as well operate in other operating environments.

It should be noted that in the present disclosure, the first communication node may be a base station-side device (in other words, a reference signal transmitting end or a transmitting end); the second communication node may be a terminal-side device (in other words, a reference signal receiving end or a receiving end). As a matter of course, the first communication node may as well be a terminal device, in which case the solutions according to the embodiments of the present disclosure are applied to Device to Device (D2D) communication.

Embodiment 1

Figure 1:
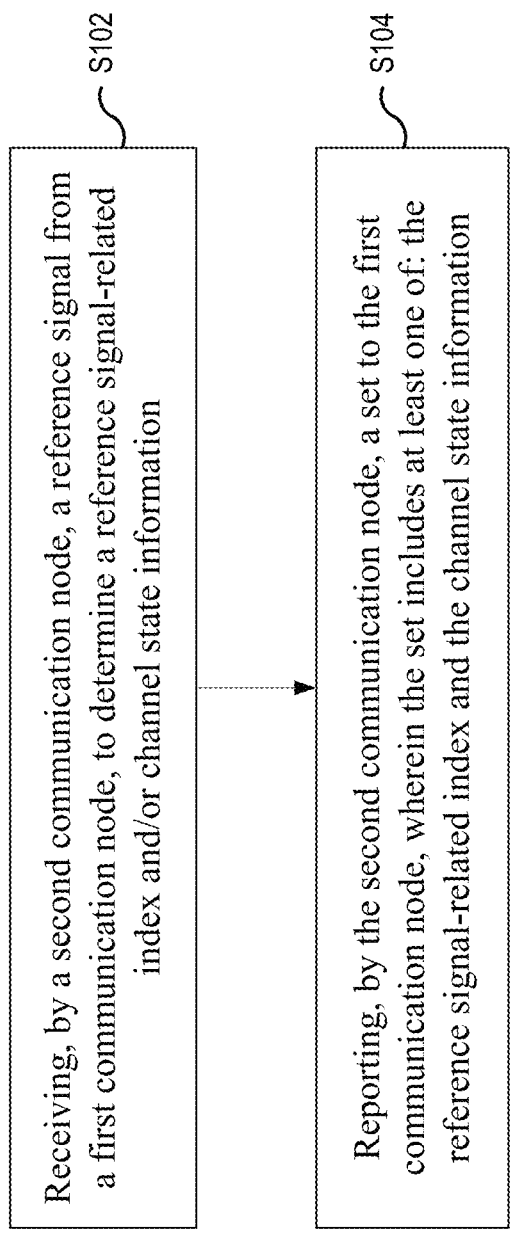
FIG. 1 is a flowchart illustrating a method for information reporting according to an embodiment of the present disclosure.

A method for information reporting is provided according to the embodiment, which is operable on base station side of the network structure above. FIG. 1 is a flowchart illustrating a method for information reporting according to an embodiment of the present disclosure. As shown in FIG. 1, the method includes:

At S102, receiving, by a second communication node, a reference signal from a first communication node, to determine a reference signal-related index and/or channel state information;

At S104, reporting, by the second communication node, a set to the first communication node, wherein the set includes at least one of: the reference signal-related index and the channel state information.

By the steps above, the second communication node receives the reference signal from the first communication node, to determine the reference signal-related index and/or channel state information; the second communication node reports the set to the first communication node, wherein the set includes at least one of: the reference signal-related index and the channel state information. This technical solution solves the problems of low flexibility and poor adaptability of beam-related information reporting in the related art; the second communication node reports its own capability, so that the first communication node can indicate a beam reporting that meets to user capability, thereby improving the stability of beam-related information reporting.

According to some embodiments, the set includes Q groups, and each group may include at least one of: a group index, a reference signal-related index, and channel state information. The reference signal-related index may include at least one of: a reference signal configuration index, a reference signal resource set index, a reference signal resource index, a reference signal port index, a measurement restriction window index, a time-frequency window index, and a reporting configuration index. The channel state information may include at least one of: a Channel Quality Indicator (CQI), a Rank Indication (RI), a Reference Signal Receiving Power (RSRP), a Precoding Matrix Indicator (PMI), and phase information (co-phasing). Q is an integer greater than or equal to 1.

According to some embodiments, the second communication node receives configuration information for reporting the set. The configuration information may include at least one of: a group index corresponding to a group, or a subset of the group indexes corresponding to groups, where the group index corresponding to a group or the subset of the group indexes corresponding to groups is a subset of a set of group indexes; grouping constraint information; grouping criteria; and reference signal configuration.

According to some embodiments, the grouping constraint information includes at least one of: the number of groups; a relative or absolute threshold for determining whether the second communication node reports the set, at a measurement metric; the X-th strongest beam grouping at a measurement metric; and the first Y strongest beam grouping at a measurement metric, where X is an integer greater than or equal to 1, or X is a set consisting of no less than one positive integers, and X is configured or pre-configured by the first communication node; where Y is an integer greater than or equal to 1. It should be added that the metrics may include at least one of: BLER, CQI, received signal power, RSRP, RSRQ, channel capacity, signal-to-noise ratio at the receiving end, and signal-to-noise ratio at the receiving end.

According to some embodiments, the set of group indexes is configured by the first communication node.

According to some embodiments, in the case where the configuration information includes a subset of the group indexes corresponding to groups, the second communication node reports the set by using one of the grouping information including: an index in the subset of group indexes corresponding to groups, and indexes obtained by renumbering the indexes in the subset of group indexes corresponding to groups. Alternatively, when reporting the set, the second communication node does not report the information of the group index, in the case where the configuration information includes a subset of group indexes corresponding to groups.

According to some embodiments, the grouping criteria includes at least one of: reference signals in the same group cannot be received simultaneously at the second communication node, or reference signals in the same group can be received simultaneously at the second communication node; reference signals in different groups can be received simultaneously at the second communication node, or reference signals in different groups cannot be received simultaneously at the second communication node; reference signals in each group cannot be multiplexed, or reference signals in each same group can be multiplexed; reference signals in different groups cannot be multiplexed, or reference signals in the different groups can be multiplexed; reference signals in each group cannot be transmitted simultaneously by the first communication node, or reference signals in each group can be transmitted simultaneously by the first communication node. The grouping criteria includes a first-level grouping criteria; or first-level and second-level grouping criteria for a two-level grouping; or kth-level grouping criteria for a K-level grouping, where K and k are integers greater than or equal to 1, and K is greater than or equal to k.

According to some embodiments, before the second communication node receives a reference signal from the first communication node the method further includes: transmitting from the second communication node to the first communication node, at least one of: grouping criteria supported by the second communication node; the number of transceiver unit (TXRU) in a group; the number of TXRU of a reference signal-related index in a group; the maximum number of layers in a group; the maximum number of layers of a reference signal-related index in a group; the number of groups to be reported, or a set of numbers of groups to be reported; the maximum number of groups supported; the maximum number of layers of the second communication node; the number of, or the maximum number of, reference signal resources or antenna ports that are measured simultaneously; the number of time-domain repetitions of the reference signal resource under a measurement restriction or in a time-frequency measurement window; and the number of time-domain units occupied by reference signal resource under a measurement restriction or in a time-frequency measurement window. It should be added that the maximum number of layers of a communication node may be the number of radio frequency links of the device; the number of or the maximum number of reference signal resources or antenna ports that are measured simultaneously represents the capability of simultaneously receiving different transmitting beams (panel number); the number of time-domain repetitions of the reference signal resources corresponds to the number of receiving beams to be measured.

According to some embodiments, the time-domain unit include one of:

$$\frac{M}{N}$$

of an Orthogonal Frequency Division Multiplexing (OFDM) symbol, an OFDM symbol, a slot, or a subframe, where M and N are integers greater than or equal to 1.

According to some embodiments, the second communication node support at least one of the modes of:
transmitting RSRP and RI in the same report format, slot, subframe or slot/subframe bundling element;
transmitting RSRP and PMI in the same report format, slot, subframe or slot/subframe bundling element;
transmitting RSRP and Co-phasing in the same report format, subframe or slot/subframe bundling element; and
transmitting RSRP and CQI in different report formats.

According to some embodiments, the reporting by the second communication node a set to the first communication node includes: reporting, by the second communication node, a first-type reporting information and a second-type reporting information to the first communication node; and in the event of a collision between the first-type and second-type reporting information, transmitting the first-type reporting information preferentially based on a preset rule, or transmitting the second-type reporting information preferentially based on a preset rule. The first-type reporting information includes at least: RSRP report; the second-type reporting information includes at least one of reporting of: RI, PMI, co-phasing, and CQI.

According to some embodiments, the reporting by the second communication node a set to the first communication node includes: reporting, by the second communication node, a reference signal-related index to the first communication node, the reference signal-related index reported by the second communication node being associated with a channel quality (or a channel quality degradation rate) that meets a first predetermined condition, or the reference signal-related index configured to request the first communication node to transmit a reference signal having a channel characteristic, and the channel characteristic meeting a reference signal channel characteristic requirement indicated by the reference signal-related index. The channel characteristic requirement may include one of: QCL and a spatial receiving parameter requirement.

According to some embodiments, the reporting by the second communication node a reference signal-related index is triggered by a first communication node, or is triggered by the second communication node meeting a second predetermined condition.

According to some embodiments, the first predetermined condition includes at least one of: the channel quality associated with the reference signal-related index is lower than a pre-defined or configured threshold; the difference between the channel quality associated with the reference signal-related index and the highest reference signal quality measured at the second communication node is lower than a pre-defined or configured threshold; the difference between the channel quality associated with the reference signal-related index and an average of N highest reference signal qualities is lower than a pre-defined or configured threshold; the difference between the channel quality associated with the reference signal-related index and a cell signal quality is lower than a pre-defined or configured threshold.

According to some embodiments, the channel quality is an average, a highest, a lowest, or a weighted average of channel qualities in one or more time windows.

According to some embodiments, the reference signal includes one or more reference signal resources. Antenna ports of the same reference signal resource meet a predetermined channel characteristic requirement, or antenna ports of the same reference signal resource do not meet a predetermined channel characteristic requirement.

According to some embodiments, whether or not antenna ports of the same reference signal resource meet a channel characteristic requirement is configured by the first communication node to the second communication node; or determined by the second communication node, according to a graph of the reference signal, a code division scheme of the reference signal or the number of antenna ports of the reference signal.

According to some embodiments, when antenna ports of the same reference signal resource meet a channel characteristic requirement, the set of a reference signal-related index and channel state information includes at least: a reference signal resource index. When antenna ports of the same reference signal resource do not meet a channel characteristic requirement, the set of a reference signal-related index and channel state information includes at least: a reference signal port index, a reference signal port index, and a reference signal resource index.

According to some embodiments, when antenna ports of the same reference signal resource are code division multiplexed, spatial receiving parameters of the antenna ports meets a Quasi Co-Location (QCL) assumption.

According to some embodiments, after X time elements following the reference signal being configured by the first communication node, or X time elements following the second communication node's acknowledgement, the reference signal is used to indicate the second communication node to report the set of a reference signal-related index and channel state information, where the time element may be at least one of OFDM symbol, slot, and subframe.

A method for information transmission is provided according to another embodiment of the present disclosure. The method includes:
Step 1: determining, by a second communication node, reference signal resource-related information to be sent to a first communication node; and
Step 2: transmitting the related information to the first communication node.

According to some embodiments, the reference signal resource-related information includes at least one of: grouping-related information; the maximum number of layers in a group; the maximum number of layers of an uplink reference signal; the maximum number of layers of a downlink reference signal; uplink reference signal capability information; uplink or downlink reference signal capability information of a first group, where the first group is configured by the first communication node or reported by the second communication node; uplink or downlink reference signal configuration request information of a second group, where the second group is configured by the first communication node or reported by the second communication node; uplink reference signal configuration request information corresponding to an uplink reference signal-related index, or downlink reference signal configuration request information corresponding to a downlink reference signal-related index, where the uplink or downlink reference signal-related index is configured by the first communication node or reported by the second communication node; uplink reference signal configuration request information when a spatial filter the same as or similar to what is used for the uplink reference signal is used, or downlink reference signal configuration request information when a spatial filter the same as or similar to what is used for the downlink reference signal is used, wherein the uplink or downlink reference signal is configured by the first communication node or reported by the second communication node, where the reference signal-related index may include at least one of: a reference signal configuration index, a reference signal resource set index, a reference signal resource index, a reference signal port index, a measurement restriction window index, a time-frequency window index, and a reporting configuration index.

According to some embodiments, the uplink reference signal includes at least one of: Uplink DeModulation Reference Signal (UL DMRS); Sounding Reference Signal (SRS); and Phase Tracking Reference Signal (PTRS).

According to some embodiments, the second communication node groups the uplink reference signals by at least one of grouping criteria in which:
different reference signals in the same group cannot be transmitted simultaneously, or the second communication node less prefers or does not support different reference signals in the same group be indicated for the same transmission;
no more P different reference signals in the same group can be transmitted simultaneously, or the second communication node less prefers or does not support more than P different reference signals in the same group to be indicated for the same transmission;
different reference signals in the same group can be transmitted simultaneously, or the second communication node supports different reference signals in the same group to be indicated for the same transmission;
different reference signals in different groups cannot be transmitted simultaneously, or the second communication node less prefers or does not support different reference signals in different groups to be indicated for the same transmission;
no more Q reference signals in different groups can be transmitted simultaneously, or the second communication node less prefers or does not support more than Q different reference signals in different groups to be indicated for the same transmission; and
reference signals in different groups can be transmitted simultaneously, or the second communication node supports different reference signals in different groups to be indicated for the same transmission,
where P and Q are integers greater than or equal to 1.

According to some embodiments, the second communication node notifies the first communication node of P or Q.

According to some embodiments, the same transmission refers to transmissions of different reference signals occurring simultaneously in at least one given time.

According to some embodiments, the uplink reference signal configuration-related signaling received by the second communication node includes group index indication information.

According to some embodiments, the second communication node transmits an uplink reference signal according to the group index indication information.

According to some embodiments, the grouping-related information includes at least one of: group index, uplink reference signal resource index, uplink reference signal resource set index, uplink reference signal resource antenna port index, and window index, wherein the group index includes at least one of: uplink group index and downlink group index. It should be added that in the case of beam correspondence, uplink grouping may inherit downlink grouping characteristics.

According to some embodiments, the uplink reference signal configuration request information includes at least one of: a type of uplink reference signal, the number of antenna ports of uplink reference signal resources, the number of uplink reference signal resources, the number of uplink reference signal resource sets.

According to some embodiments, the uplink reference signal capability information includes at least one of: the number of TXRUs; the maximum number of antenna ports of an uplink reference signal resource; the maximum number of layers; the number of groups to be indicated, or a set of the number of groups to be indicated; the maximum number of groups to be supported; the number, or the maximum number of reference signal resources or antenna ports that can be simultaneously transmitted; the number, or the maximum number of uplink reference signal resources; and the number of time domain repetitions of the uplink reference signal resources.

A method for information reporting is provided according to another embodiment of the present disclosure. The method includes:

Step 1: transmitting, by a first communication node, reference information to a second communication node, where the second communication module determines a reference signal-related index and/or channel state information according to the reference signal; and Step 2: receiving a set reported by the second communication node, where the set includes at least one of: the reference signal-related index and the channel state information.

Preferred embodiments of the present disclosure are described in detail below.

Technical terms used in the present disclosure are explained as follows prior to the description of the preferred embodiments:

A reference signal includes at least one of: cell reference signal (CRS), channel state information reference signal (CSI-RS), channel state information reference signal for beam management, channel state information interference measurement signal (CSI-IM), demodulation reference signal (DMRS), downlink demodulation reference signal, uplink demodulation reference signal, channel sounding reference signal (SRS), phase tracking reference signal (PT-RS), motion related reference signal (MRS), beam reference signal (BRS), beam refinement reference signal (BRRS), random access channel signal (RACH), synchronization signal (SS), synchronization signal block (SS block), primary synchronization signal (PSS), and secondary synchronization signal (SSS).

An identity indication includes but is not limited to: a media access control (MAC) address, cell radio network temporary indication (C-RNTI), temporary C-RNTI (TC-RNTI), or a dedicated ID allocated by the base station to the UE.

Grouping of beam-related information refers to dividing beams and related channel state information having the same channel characteristics and/or transmission scheme into sets. Channel characteristics include physical propagation channel characteristics, such as Quasi co-location (QCL), horizontal transmitting tilt angle, vertical transmitting tilt angle, horizontal receiving tilt angle, vertical receiving tilt angle, etc., as well as radio frequency and base band circuit characteristics, such as element pattern, antenna placement, and baseband time offset, frequency offset and phase noise, etc.

A group may also be called a set.

A beam may be a resource (e.g., originating precoding, terminating precoding, antenna port, antenna weight vector, antenna weight matrix). Beam sequence numbers and resource indexes are interchangeable, because beams can be bound to some time-frequency code resources, for transmission. A beam may also be a transmission (transmit/receive) scheme; the transmission scheme may include: space division multiplexing, frequency/time domain diversity, etc.

Receiving beam indication means that the transmitting end may indicate by using the current reference signal and antenna port, and the reference signal reported by the UE (i.e., standard reference signal) and a quasi co-location (QCL) assumption of the antenna port.

The receiving beam refers to a beam at a receiving end where indication is not needed, or, beam resources at a receiving end that the transmitting end may indicate by using the current reference signal and antenna port, and the reference signal reported by the UE (i.e., standard reference signal) and a quasi co-location (QCL) assumption of the antenna port.

Channel state information includes Precoding Matrix Indicator (PMI), Channel Quality Indicator (CQI), Reference Signal Received Power (RSRP), Reference Signal Receive Quality (RSRQ), Rank Indicator (RI), etc.

Quasi-co-location (QCL) parameters include, at least, Doppler spread, Doppler shift, delay spread, average delay and average gain; and may also include, spatial parameters or spatial receiving parameters, such as Angle of arrival, spatial correlation of the receiving beams, average delay, correlation of time-frequency channel response (including phase information).

Figure 2:
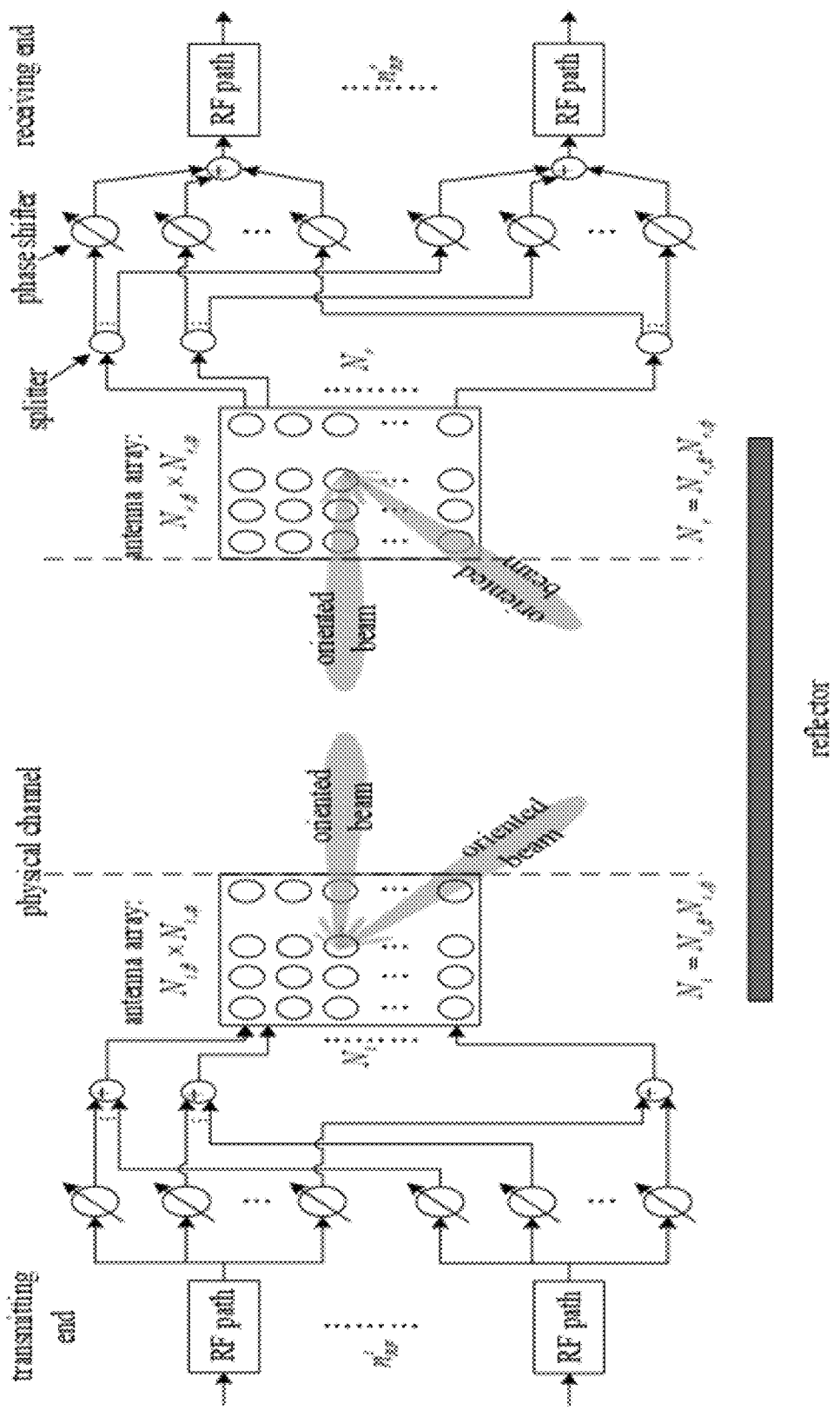
FIG. 2 is a schematic structural diagram illustrating a hybrid precoding (hybrid analog-digital beamforming) transceiver according to a preferred embodiment of the present disclosure.

FIG. 2 is a schematic structural diagram illustrating a hybrid precoding (analog-digital hybrid beamforming) transceiver according to a preferred embodiment of the present disclosure. Multi-antenna units and multiple radio frequency links are configured at the transmitting end and the receiving end of the system. Each RF link is connected (including partially connected) to an antenna array unit, and each antenna unit includes a digital keying phase shifter. The high-frequency system realizes analog beamforming by applying different phase shifts on the signals of different antenna units. In particular, there are multiple RF signal streams in the hybrid beamforming transceiver. Each signal stream is applied with an antenna weight vector (AWV) by the digital keying phase shifter, and transmitted from the multi-antenna units to a high-frequency physical propagation channel. At the receiving end, the RF signal streams received by the multi-antenna unit are weighted and combined into a single signal stream. The receiving end performs radio frequency demodulation, and the receiver finally obtains multiple receiving streams, which are digital baseband sampled and received. Therefore, a hybrid precoding (analog-digital hybrid beamforming) transceiver can simultaneously generate radio frequency beams directed in multiple directions.

At the same time, the transmitting end and the receiving end of the system may have multiple panels, to support better space division multiplexing and to reduce hardware implementation complexity. Therefore, on each panel, the number of effective beams is asymmetrical with the maximum number of beams that are actually supported, that is, at any time, the number of beams that can be transmitted, i.e., the number of TXRUs, is significantly smaller than the number of candidate beams. In this case, the user should inform the base station side of its downlink and uplink capabilities.

From a downlink perspective, the base station first sends a reference signal to the user terminal. Then, the user terminal groups reference signal-related index information (e.g., CSI-RS resource indicator, CRI) according to its own capabilities, for example, in a format: {group index, {CRI1, channel state information}, . . . , {CRIx, channel state information}}, . . . .

Specifically, the reference signal-related index includes at least one or a combination of: a reference signal configuration index, a reference signal resource set index, a reference signal resource index, a reference signal port index, a measurement restriction window index, a time-frequency window index, and a reporting configuration index. For example, when CSI is used, it could be CSI resource setting ID+CSI resource set ID+CRI+MR window ID. Table 1 below is a schematic table illustrating a beam grouping according to a preferred embodiment.

TABLE 1

| Group Index_1 | Reference signal-related index . . . | Channel State Information . . . |
|---|---|---|
| | Reference signal-related index | Channel State Information |
| Group Index_2 | Reference signal-related index . . . | Channel State Information |
| | Reference signal-related index | Channel State Information |
| . . . | . . . | . . . |

It should be noted that the group indexes may be implied in a grouping report, i.e., indicated implicitly according to a predetermined rule. For example, the rule may include reporting in an order and a group format that are explicitly configured by the base station. In this way, the group indexes in the reporting can be implicitly obtained.

Figure 3:
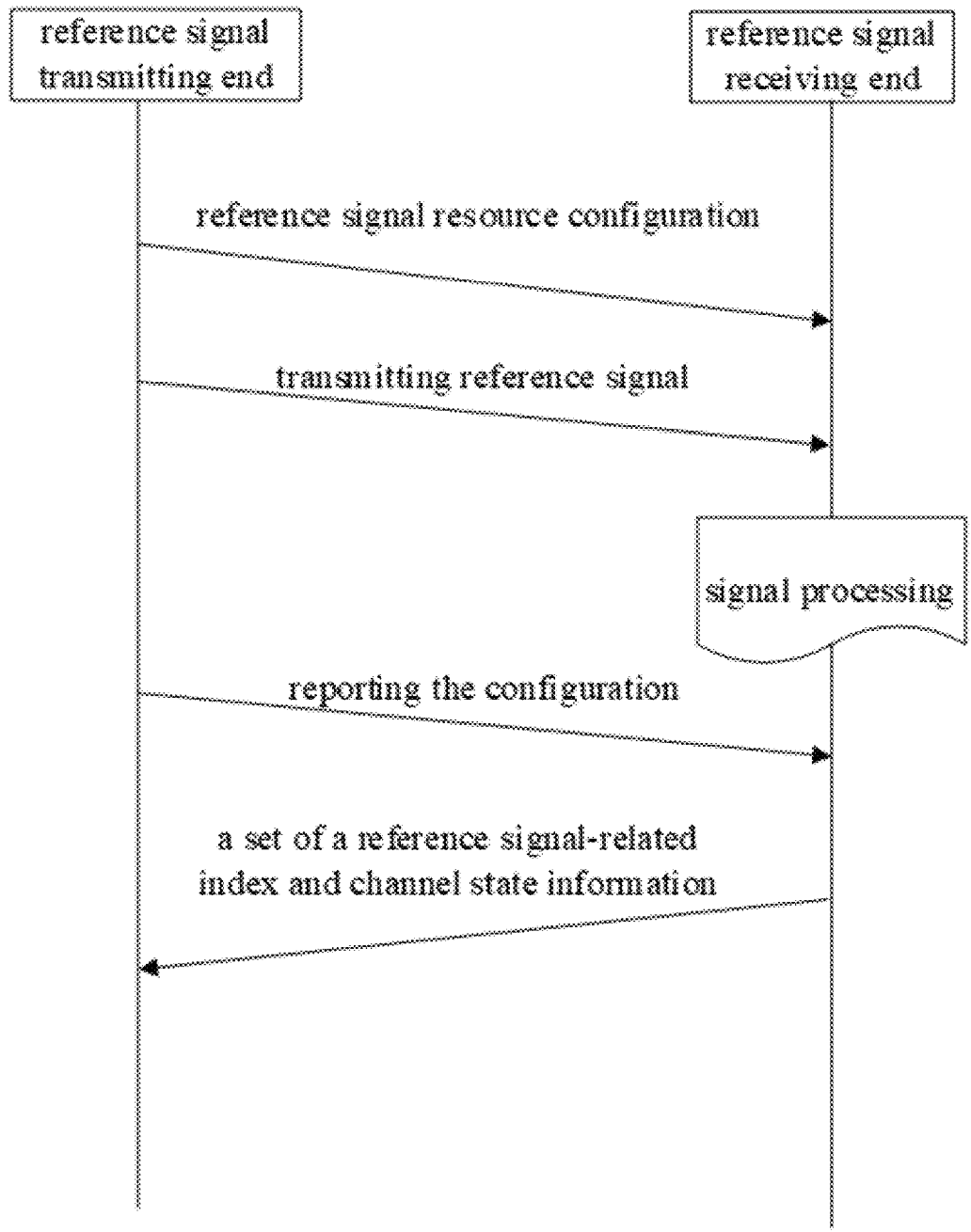
FIG. 3 is a schematic diagram illustrating reference signal transmission and channel-related information feedback according to a preferred embodiment of the present disclosure.

FIG. 3 is a schematic diagram illustrating reference signal transmission and channel-related information feedback according to a preferred embodiment of the present disclosure. Specifically, the reference signal transmitting end (for example, a base station end, the first communication node in the embodiments above) transmits allocation information of a downlink reference signal to the reference signal receiving end (for example, a user terminal, the second communication node in the embodiments above), and then transmits the downlink reference signal. The user terminal performs signal processing, and upon receiving the report format configuration and triggered, the user terminal reports back a set of a reference signal-related index and channel state information to the transmitting end.

For reference signal grouping or beam grouping, the grouping criteria include one and a combination of: reference signals in the same group cannot be received simultaneously, reference signals in different groups can be received simultaneously, reference signals in the same group can be received simultaneously, reference signals in different groups cannot be received simultaneously, reference signals in the same group cannot be multiplexed, reference signals in the same group can be multiplexed, reference signals in different groups cannot be multiplexed, reference signals in different groups can be multiplexed, reference signals in the different groups cannot be transmitted simultaneously, and reference signals in the same group can transmitted.

For example, the reference signal transmitting end may indicate reference signal grouping according to the rule {3, 4, 6} below: {reference signals in the same group can be received simultaneously, reference signals in the same group cannot be multiplexed, reference signals in different groups cannot be received simultaneously}

This means that reference signals in the same group can be used simultaneously by the base station, and can be space division multiplexed. From an implementation perspective, each group corresponds to a combination of reference signals that can be seen by each panel-TXRU in a user terminal panel-TXRU group. Depending on receiving modes, the user can effectively place reference signals with a relatively small crosstalk and easy to transmit at the same time in one whole. Based on this grouping information, the base station can clearly guide resource scheduling. It should be noted that due to the limitations on the capability of the UE, the UE may inform the base station end of a grouping criteria or a grouping criteria combination that the UE supports; and the base station end may determine a suitable grouping criteria according to the capability notified by the UE.

The grouping criteria may be applied to a plurality of levels, e.g., including a first-level grouping criteria, or first-level and second-level grouping criteria for a two-level grouping, or kth-level grouping criteria for a K-level grouping, where K and k are integers greater than or equal to 1, and K is greater than or equal to k.

Figure 4:
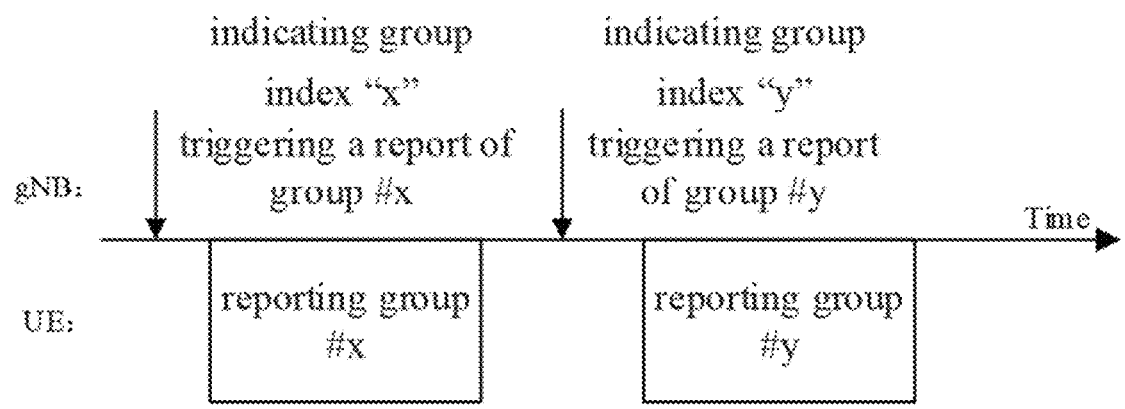
FIG. 4 is a schematic diagram illustrating a base station indicating a group index to a user according to a preferred embodiment of the present disclosure.

FIG. 4 is a schematic diagram illustrating a base station indicating a group index to a user according to a preferred embodiment of the present disclosure. The base station may also indicate, in the report configuration, a group index corresponding to a group or a subset of the group indexes corresponding to groups, to specify a particular group for feedback. The group index corresponding to the group or the subset of the group indexes corresponding to groups, is a subset of a set of group indexes. Moreover, the set of group indexes may be configured by the base station, representing specific characteristics of each group, for clear grouping indication. For example, the system may support user grouping feedback based on indexes configured by the base station, and may support user group feedback without indexes configured by the base station. Without the index configured by base station, the user may perform grouping feedback, and the base station may remap the reported group index and notify the user terminal.

Figure 5:
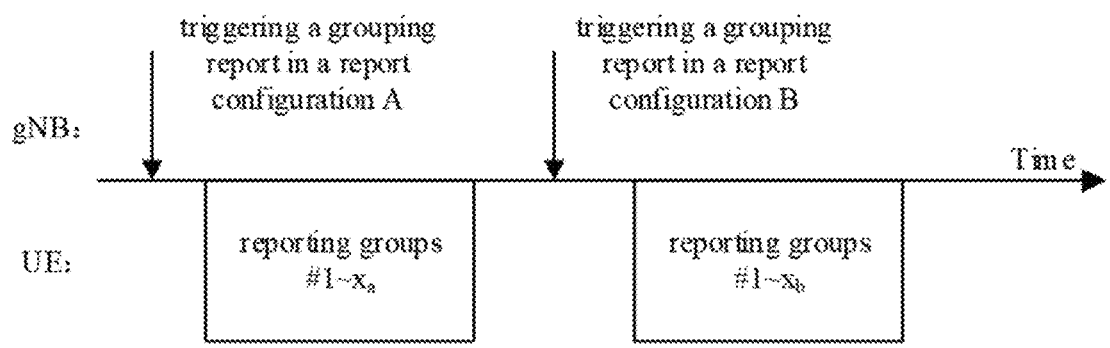
FIG. 5 is a schematic diagram illustrating a beam reporting with report configuration in according to a preferred embodiment of the present disclosure.

FIG. 5 is a schematic diagram illustrating a beam reporting with report configuration in according to a preferred embodiment of the present disclosure.

If in the report configuration, the base station indicates a subset of the group indexes corresponding to groups, the grouping information used for report includes indexes in the subset or indexes which are obtained by renumbering indexes in the subset. For example, when original indexes are {1,4,7,9} and renumbered indexes are {0,1,2,3}, the user will report the renumbered indexes. If the base station indicates group indexes corresponding to groups, the user will not report group indexes.

According to predetermined or user end reported grouping criteria and the number of groups that can be supported, the base station end may negotiate with the user global index information of grouping. Based on the global index information of grouping, the base station may indicate in each report only a portion of the grouping information that it indicates. In this way, unnecessary beam reporting overhead can be effectively avoided; and from a standardization perspective, the number of groups that each report supports can be smaller than the number of groups the standard supports. The base station may specify a portion of the groups for feedback according to channel quality, BLER conditions, user feedback, and self-scheduling.

In addition, the base station end may define constraint information in the beam reporting that the grouping needs to meet. The constraint information includes at least one of: the number of groups, which includes the number of groups reported or the maximum number of groups that can be reported; or a relative or absolute threshold for determining whether or not report, at a measurement metric, i.e., if the measurement metric is lower than the threshold, the UE does not need to report grouping; or the X-th strongest beam grouping at a measurement metric; or the first Y strongest beam grouping at a measurement metric, where X is an integer greater than or equal to 1, or a set consisting of no less than one positive integers, and X is configured by the reference signal transmitting terminal or based on a predetermined rule;

where Y is an integer greater than or equal to 1;

where the measurement metric may include at least one of: BLER, CQI, received signal power, RSRP, RSRQ, channel capacity, signal-to-noise ratio at the receiving end, and signal-to-noise ratio at the receiving end.

Considering beam information reflects on the reference signal correlation index, the reporting configuration of beam reporting needs to be associated with the reference signal set, which is referred to as reference signal configuration. It should be noted that the reference signal set may correspond to such information as reference signal resource, reference signal resource set, and reference signal antenna port configuration. Therefore, beam reporting may include reportings under a variety of reporting configurations (e.g, grouping criteria, indication of group indexes of a grouping) of the same set of reference signals, so that the reference signal configuration may actually be in a set of reference signal configurations, and the user selects one or more reference signals from a reference signal set for feedback.

To support group reporting, the reference signal receiving end notifies the reference signal transmitting end of its own capabilities, including:

1) supported grouping criteria;
2) the number of TXRU in a group;
3) the number of TXRU of a reference signal-related index in a group;
4) the maximum number of layers in a group;
5) the maximum number of layers of a reference signal-related index in a group;
6) the number of groups to be reported, or a set of numbers of groups to be reported;
7) the maximum number of groups supported;
8) the maximum number of layers;
9) the number of, or the maximum number of, reference signal resources or antenna ports that are measured simultaneously;
10) the number of time-domain repetitions of the reference signal resource under a measurement restriction or in a time-frequency measurement window;
11) the number of time-domain units used by reference signal resource under a measurement restriction or in a time-frequency measurement window.

The time-domain unit includes:

$$\frac{M}{N}$$

of an Orthogonal Frequency Division Multiplexing (OFDM) symbol, an OFDM symbol, a slot, and a subframe, where M and N are integers greater than or equal to 1.

The simultaneously measured reference signal resources or antenna ports have different QCL assumption for different transmitting beams. Therefore, the number or the maximum number of reference signal resources or antenna ports measured simultaneously represents the capabilities of the UE to simultaneously receive different transmit beams, i.e., the number of panels. However, the number of time-domain repetitions of the reference signal resource, or the number of time-domain units used by reference signal resource, under a measurement restriction or in a time-frequency measurement window, corresponds to the number of receiving end beams to be measured by the UE. Because the beam-related measurements are all performed while transmitting and receiving beams, the user needs to notify the transmitting ends of the capability of simultaneously transmitting beams and the requirements of the receiving beams to be measured.

The user capability or capability set is indicated by the reference signal transmitting end or preconfigured.

The user capability or capability set may be transmitted prior to the set of reference signal-related index and channel state information; or, The user capability or capability set may be transmitted in the same format, subframe or subframe group as the set of reference signal-related index and channel state information, or transmitted after the set of reference signal-related index and channel state information.

The channel state information related information may have a specific report format because it may include various types of state information. As an important indicator of beam characteristics, RSRP represents the channel quality strength over the current link (i.e., simple SISO), but cannot represent the capability on MIMO transmission. Therefore, the system needs to support at least one of the following modes or a combination thereof.

1) RSRP and RI are transmitted in the same report format, slot, subframe or slot/subframe bundling element.

RSRP and RI are transmitted to provide a receiving signal strength and the number of supported RIs under the reference signal indicated in reporting. The number of RIs represents the limitation on the capability of the user end (e.g., capability to support RI), and also represent the support of the channel.

2) RSRP and PMI are transmitted in the same report format, slot, subframe or slot/subframe bundling element.

RSRP and PMI are transmitted to provide a receiving signal strength and the number of recommended Precoding Matrix Indicators (PMIs) under the reference signal indicated in reporting. One reference signal resource, i.e., CSI- RS resource, may support a plurality of antenna ports, and therefore the user may obtain the recommended PMIs from measurement of the reference signal.

3) RSRP and Co-phasing are transmitted in the same report format, subframe or slot/subframe bundling element.

Co-phasing may be seen as a simplified version of PMI, i.e., when a CSI-RS resource supports only two antenna ports (the default I- and Q-paths), in which case co-phasing can be reported together with RSRP, to report to the transmitting terminal directly the PMI used for future data transmission.

4) RSRP and CQI are sent in different report formats.

In practice, beam reporting with RSRP and a general CSI acquisition transmission without RSRP may collide; hence a prioritization of reporting is needed. When a collision between first-type and second-type reporting information occurs, the first-type report may be transmitted preferentially based on a preset rule, or the second-type report may be transmitted preferentially based on a preset rule.

The first-type report includes at least: RSRP report.

The second-type report includes at least one of: RI, PMI, co-phasing, and CQI reports.

The reference signal transmitting end may be configured with a low-priority transmission mode. That is, the reference signal receiving end performs beam reporting only after a measuring condition of the reference signal meets a reference signal quality condition. The reference signal quality condition and uplink transmission resources may be configured by the reference signal transmitting end to the reference signal receiving end. In addition to the case where the channel quality corresponding to the reference signal is lower than a threshold, if the channel quality corresponding to the reference signal is greater than a threshold (configurable by the base station) or the grouping situation changes, the reference signal receiving end may use a specified uplink resource (e.g., scheduling-free uplink resource) to report, e.g., grouping information. Further, in addition to the reference signal quality condition (referred to as the first condition), the reference signal receiving end transmits the reference signal-related index on another condition (referred to as the second condition) that is related to resource configuration and receiver state or mode. For example, the base station side configures the time-frequency resource required for transmitting information, a window where comes the time-frequency resource, and a synchronization state for the reference signal receiving end.

In addition, the reference signal receiving end may request the reference signal transmitting end to transmit a reference signal of the reference signals indicated by the reference signal-related indexes in the report that meets a reference signal channel characteristic requirement. This action may be implemented by the base station indicating the user to report, or may be actively initiated by the user when the reference signal quality condition is met. The channel characteristic requirement include one of: QCL, channel characteristic requirement. The request may also by triggered by the reference signal transmitting end, or may be transmitted by the reference signal receiving end according to a condition.

In summary, the condition includes one or a combination of:

1) lower than a pre-defined or configured threshold;
2) the difference with the highest reference signal quality is lower than a pre-defined or configured threshold;
3) the difference with the average of N highest reference signal qualities is lower than a pre-defined or configured threshold; and 4) the difference with a cell signal quality is lower than a pre-defined or configured threshold.

The channel quality may be an average, a highest, a lowest, or a weighted average in one or more time windows.

The reference signal includes one or more reference signal resources, wherein antenna ports of the same reference signal resource meet a spatial receiving parameter QCL characteristic; or antenna ports of the same reference signal resource do not meet a spatial receiving parameter QCL characteristic. Whether or not antenna ports of the same reference signal resource meet a spatial receiving parameter QCL characteristic is configured by the reference signal transmitting end to the reference signal receiving end, or assumed according to a predetermined method (e.g., based on a graph, a code division scheme or the number of antenna ports of the reference signal.) For example, when the number of antenna ports is less than 2, it is assumed that antenna ports of the same reference signal resource meets a spatial receiving parameter QCL assumption; in other cases, it is assumed that the assumption is not necessarily met, or it is assumed that the assumption is not met for the UE.

In the case that the spatial receiving parameter QCL assumption is met, the set of a reference signal-related index and channel state information includes at least: a reference signal resource index;

In the case that the spatial receiving parameter QCL assumption is not met, the set of a reference signal-related index and channel state information includes at least: a reference signal port index, a reference signal port index, and a reference signal resource index.

Figure 6:
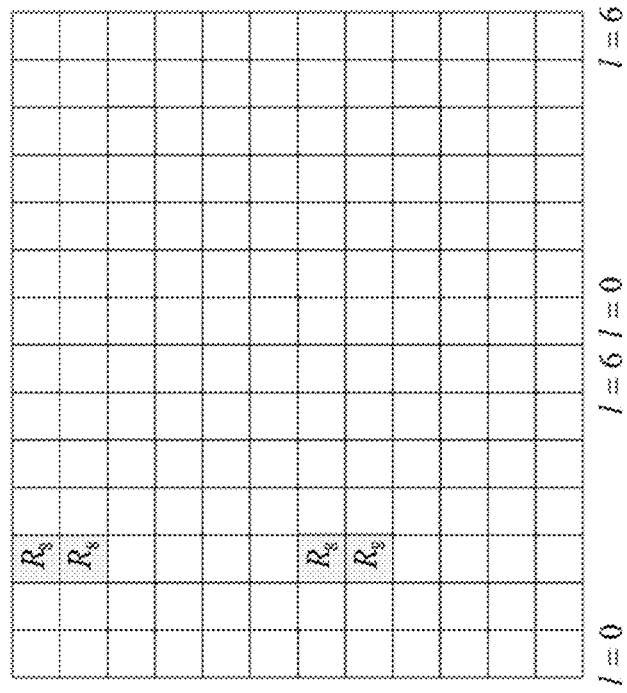
FIG. 6 is a schematic diagram illustrating code division multiplexed (CDM) antenna ports according to a preferred embodiment of the present disclosure.
Figure 6:
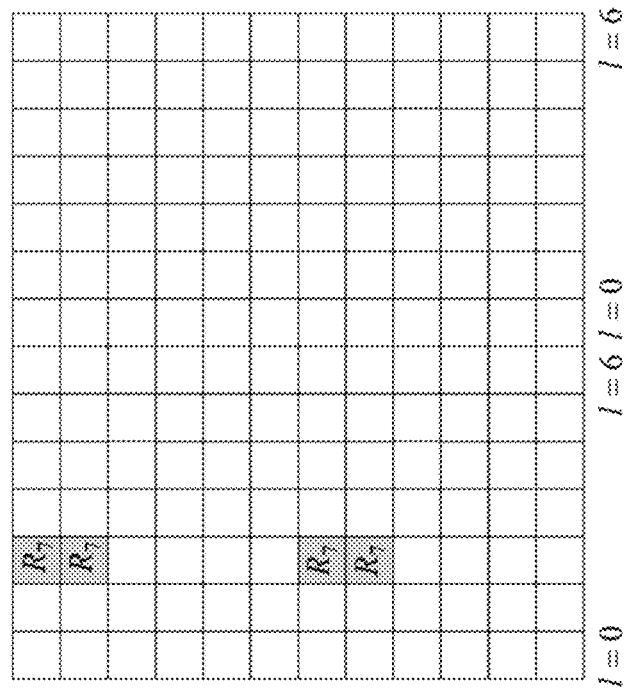

FIG. 6 is a schematic diagram illustrating code division multiplexed (CDM) antenna ports according to a preferred embodiment of the present disclosure.

Doppler shift affects differently on the reference signals under code division multiplexing; hence the orthogonality of codes cannot be ensured in CDM (including TD-CDM, FD-CDM or a combination thereof). In this case, different beams arrive at different directions, resulting in different Doppler shifts. Therefore, to apply CDM to antenna ports in the reference signal resource, spatial receiving characteristic QCL is assumed, i.e., transmitting beams are the same or similar. That is, when CDM is used on antenna ports in the reference signal resource, spatial receiving parameter QCL is assumed for the antenna ports.

Only after X time elements following the reference signal being configured, or X time elements following the terminal's acknowledgement, the reference signal can be used by the receiving terminal to report the set of a reference signal-related index and channel state information. The time element may be OFDM symbol, slot, and subframe.

In uplink beam management, precoding and beams of the uplink reference signal are indicated by the base station, or, the user can perform precoding and beam selection of the uplink reference signal using a mode transparent to the base station. The base station (i.e., uplink reference signal receiving end) determines the configuration of the uplink reference signal, but is unaware of the capabilities and requirements of the user end. Therefore, the user needs to inform or request the configuration of some uplink reference resource, i.e., the terminal transmits uplink reference signal resource-related information. Specifically, the signal includes at least one of:

1) Grouping-related information. Grouping-related information includes one or more of: group index, uplink reference signal resource index, uplink reference signal resource set index, uplink reference signal resource antenna port index and window index. The group index may be uplink group index, or downlink group index.

2) the maximum number of layers in each group; 3) the maximum number of layers of a uplink reference signal; 4) uplink reference signal configuration request information; 5) uplink reference signal capability information; 6) uplink reference signal configuration request information and/or uplink reference capability information where the grouping is configured by the base station or reported by the user; 7) uplink reference signal configuration request information where the reference signal-related index is configured by the base station or reported by the user;

8) uplink reference signal configuration request information, when a spatial filter the same as or similar to what is used for the reference signal configured by the base station or reported by the user is used.

The uplink reference signal configuration request includes at least one of: a type of uplink reference signal, the number of antenna ports of uplink reference signal resources, the number of uplink reference signal resources, the number of uplink reference signal resource sets.

The uplink reference signal capability information includes at least one of: the number of TXRUs; the maximum number of antenna ports of uplink reference signal resources; the maximum number of layers; the number of groups to be indicated, or a set of groups to be indicated; the maximum number of groups supported; the number of reference signal resources or antenna ports that can be simultaneously transmitted, the number of uplink reference signal resources; the maximum number of supported uplink reference signal resources; the number of time domain repetitions of the uplink reference signal resources.

By the grouping-related information, the user groups and classifies uplink reference signals. The grouping criteria corresponding to the grouping-related information includes one or a combination of: reference signals in the same group cannot be transmitted simultaneously; no more P reference signals in the same group can be transmitted simultaneously; reference signals in the same group can be transmitted simultaneously; reference signals in different groups cannot be transmitted simultaneously; no more Q reference signals in different groups can be transmitted simultaneously; reference signals in different groups can be transmitted simultaneously, where P and Q are integers greater than or equal to 1. Furthermore, P and Q are notified by the base station to the terminal.

It should be noted the grouping-related information here relates to the grouping of the uplink reference signals, as shown in Table 1. According to this information, for example, the grouping of the reference signals is based on a rule: reference signals in the same group cannot be transmitted simultaneously; and reference signals in different groups can be transmitted simultaneously. However, for each group, the maximum number of layers of the group is notified to the base station together with the uplink grouping. Table 2 shows an uplink reference signal grouping according to preferred embodiment.

TABLE 2

| Group Index_1 | Uplink reference signal-related index | the maximum number of layers of the group |
|---|---|---|
| | ... | ... |
| | Uplink reference signal-related index | the maximum number of layers of the group |
| Group Index_2 | Uplink reference signal-related index | the maximum number of layers of the group |
| | ... | ... |
| | Uplink reference signal-related index | the maximum number of layers of the group |
| ... | ... | ... |

The uplink reference signal may include at least one of: UL DMRS, SRS and PTRS. And the uplink reference signal configuration request information includes at least one or a combination of: a type of uplink reference signal, the number of antenna ports of uplink reference signal resources, the number of uplink reference signal resources, and the number of sets of uplink reference signal resources.

In the case of mutually distinctness or beam correspondence, downlink grouping information may be applied to uplink grouping. For example, the base station may indicate the transmission of a reference signal associated with the downlink grouping index.

The base station transmits to the terminal an uplink reference signal configuration-related signaling, including group index indication information. Further, the terminal may transmit a reference signal according to the group index indication.

Firstly, it is assumed that the base station side adopts a full digital beamforming technology, i.e., CRI-0~CRI-31 can be simultaneously transmitted. The base station side transmits CRI-0~CRI-31 downlink CSI-RS reference signals; and the UE side supports only two panels, and each panel can only transmit or receive one beam at a time. For the upstream reference signals, a panel-a may transmit SRI-0~SRI-7, and a panel-b may transmit SRI-9~SRI-14.

Figure 7:
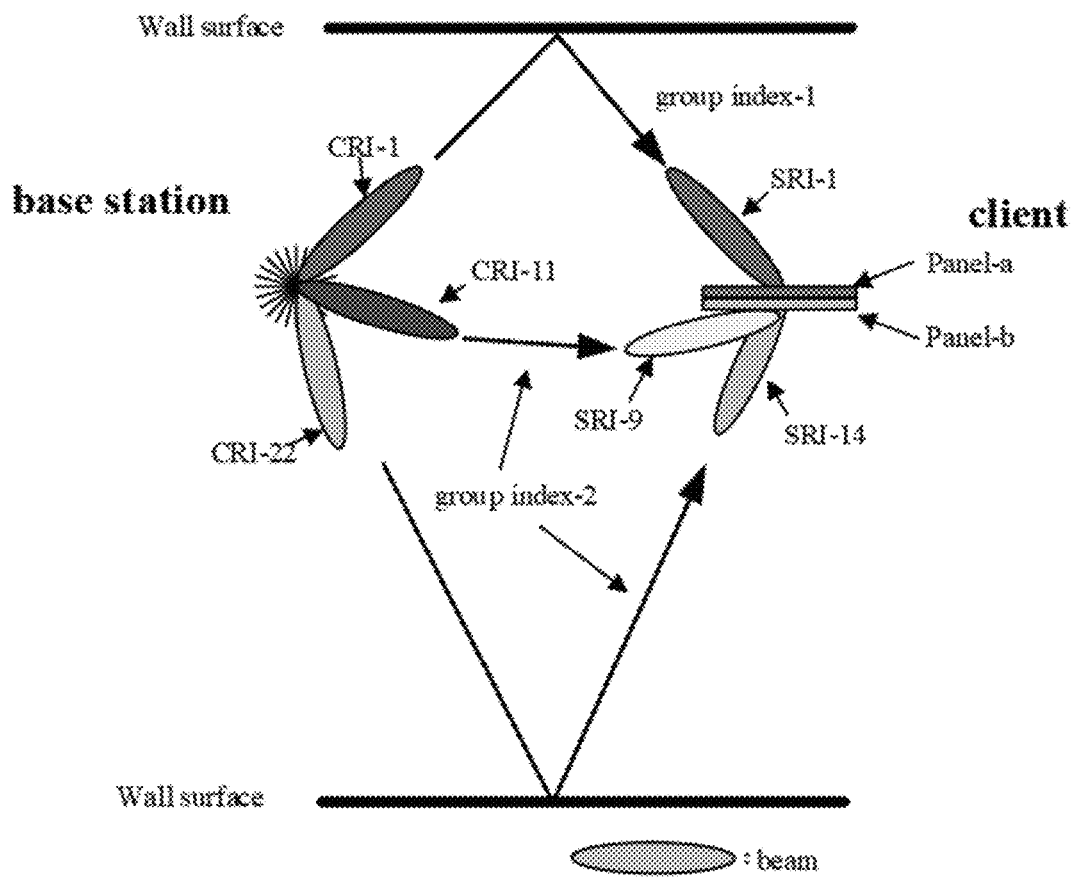
FIG. 7 is a schematic diagram illustrating uplink and downlink reference signal groupings in the case of beam correspondence according to a preferred embodiment of the present disclosure.

FIG. 7 is a schematic diagram illustrating uplink and downlink reference signal groupings in the case of beam correspondence according to a preferred embodiment of the present disclosure. In the case of downlink beam measurement, reference signals in the same group can be received simultaneously, but reference signals in different groups cannot be received simultaneously. The user terminal reports the grouping information below to the base station side.

Table 3 shows a downlink grouping according to preferred embodiment.

TABLE 3

| Group index_1 | CRI-1 |
|---|---|
| Group index_2 | CRI-11 |
| | CRI-22 |

Therefore, when transmitting the uplink reference signal, the base station may indicate the uplink reference signal by specifying a CRI index. However, if further specification of the uplink reference signal is needed, the base station can configure the SRS reference signal to transmit the user group index 1, and obtain the number of SRS reference signal resources (e.g., 8) of UE corresponding to the group index 1. The base station may configure to the user an allocation of the 8 aperiodic SRS resources for uplink reporting; the user may then transmit reference signals corresponding to SRIs 0~7. The base station assumes that the uplink reference signal resources corresponding to SRIs 0~7 cannot be simultaneously transmitted. Therefore, during uplink data transmission, the user does not expect to have the reference signals corresponding to SRIs 0~7 transmitted simultaneously, or simultaneously with other reference signals meeting QCL or using the same filter as SRIs 0~7.

Figure 8:
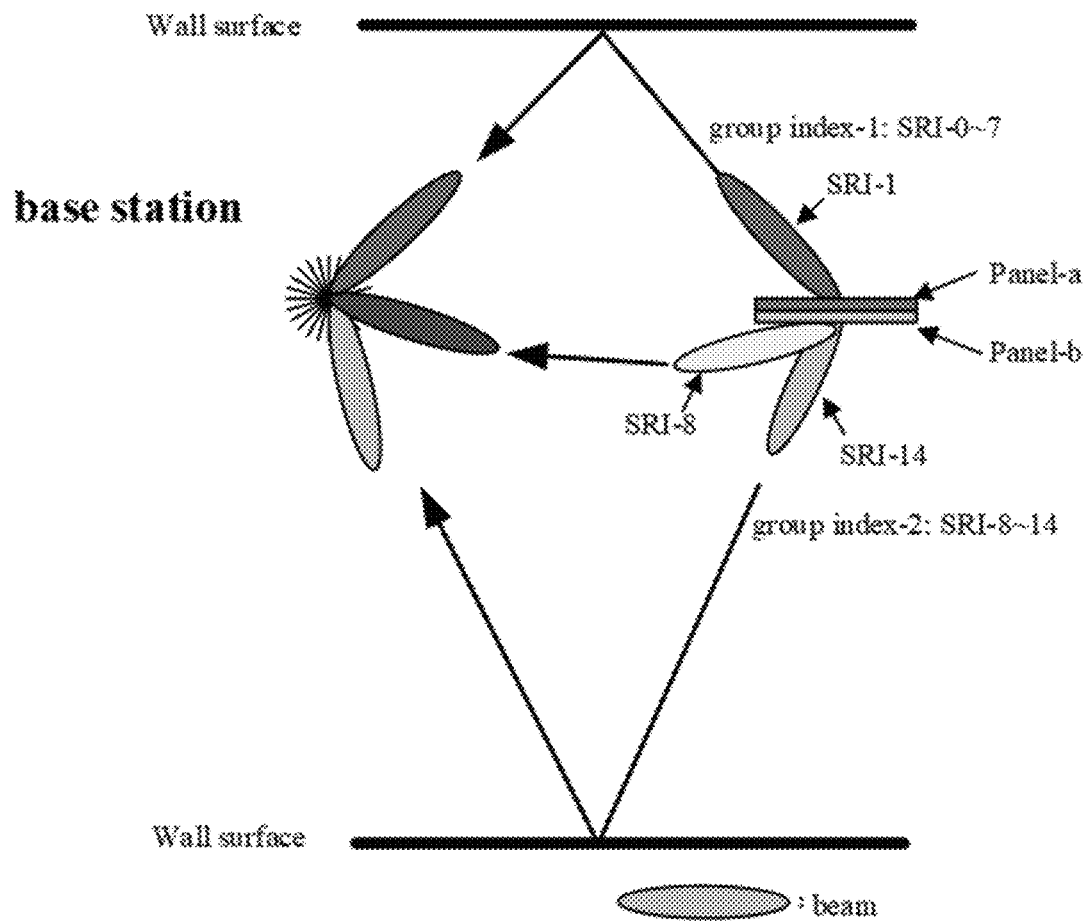
FIG. 8 is a schematic diagram illustrating an uplink reference signal grouping in the case of non-beam correspondence according to a preferred embodiment of the present disclosure.

FIG. 8 is a schematic diagram illustrating an uplink reference signal grouping in the case of non-beam correspondence according to a preferred embodiment of the present disclosure. In the case of non-beam correspondence (where the uplink beams training needs to be performed independently), the user reports its own uplink beam transmitting capability to the base station. Table 4 below is an example, showing a downlink reference signal grouping capability reporting.

TABLE 4

| | |
|---|---|
| The number of groups | 2 |
| Reference signal resources in each group for transmitting reference signals (i.e. the number of different uplink beams) | {8, 8} |
| The maximum number of layers of each group | {2, 2} |
| Grouping criteria | Reference signals in the same group cannot be transmitted simultaneously; Reference signals in different groups can be transmitted simultaneously |

Therefore, the base station may allocate the user two SRS reference signal resource set, each of the reference signal resource set includes 8 reference signal resources. Further, in each reference signal combination, the reference signal resources are separated on different time-domain units; further, reference signal resources of different reference signal resource sets may be allocated on the same time-domain resource.

Therefore, the UE transmits the two reference signal resource sets separately, one corresponding to SRIs 0~7 and the other corresponding to SRIs 8~16. The base station side, upon channel measurement, selects SRI-1, SRI-8, and SRI-14 for uplink transmission. However, SRI-8 and SRI-14 cannot be used simultaneously for a same transmission.

The reference signal resource configuration information, transmitted by the base station while configuring to the user the uplink reference signal, includes the grouping-related information. Further, the grouping-related information may be configured to a reference signal resource set, or a reference signal resource, or antenna ports of reference signal resources. The configuration of the grouping-related information indicates an association between the grouping-related information and the configured reference signal resource set, or the reference signal reference, or the signal resource antenna port. Association means that the two associated parties meet a channel feature characteristic requirement, or use the same transmitting or receiving schemes, e.g., transmitting signals on the same user terminal panel.

In summary, the technical solution provided by the embodiments of the present disclosure supports reporting by the reference signal receiving end on its own capability, so that the reference signal transmitting end can indicate beam reporting according to a beam grouping or the user capability, resolving the collisions between beam-related reporting and the conventional channel state information reporting. Especially, in case of device rotation or link obstruction, the technical solution supports the reference signal receiving end to request the reference signal transmitting end to perform partial beam training for a portion of the beams, thereby effectively achieving high beam-related information reporting with different base station, different base station and user capabilities and different scenarios.

Those skilled in the art will appreciate that all or a portion of the steps described above can be implemented with a program to instruct a related hardware, the program being stored in a computer-readable storage medium such as a read-only memory, a magnetic disk, or an optical disk. In some embodiments, all or part of the steps of the foregoing embodiments may also be implemented by using one or more integrated circuits. Accordingly, each module/unit in the foregoing embodiment may be implemented in the form of hardware or may be implemented in software. The invention is not limited to any specific form of combination of hardware and software.

It is to be understood that various modifications and improvements can be made to the present invention without departing from the scope of the invention. Corresponding changes and modifications are intended to be included within the scope of the appended claims.

The technical solution above supports reporting by the reference signal receiving end on its own capability, so that the reference signal transmitting end can indicate beam reporting according to a beam grouping or the user capability, resolving the collisions between beam-related reporting and the conventional channel state information reporting. Especially, in case of device rotation or link obstruction, the technical solution supports the reference signal receiving end to request the reference signal transmitting end to perform partial beam training for a portion of the beams, thereby effectively achieving high beam-related information reporting with different base station, different base station and user capabilities and different scenarios.

Through the description of the above embodiments, those skilled in the art can clearly understand that the method according to the above embodiment can be implemented by means of software plus a necessary general hardware platform, and of course, can also be through hardware, but in many cases the former is a better implementation. Based on such understanding, the technical solution of the present invention, which is essential or contributes to the prior art, may be embodied in the form of a software product stored in a storage medium (such as ROM/RAM, disk, the optical disc), and may include a number of instructions for causing a terminal device (which may be a cell phone, a computer, a server, or a network device, etc.) to perform the methods described in various embodiments of the present invention.

Embodiment 2

An apparatus for information reporting is provided according to the embodiment of the present disclosure, which is used to implement the above-mentioned embodiments and preferred embodiments, and has not been described again. As used below, the term "module" may implement a combination of software and/or hardware of a predetermined function. Although the devices described in the following embodiments are preferably implemented in software, hardware, or a combination of software and hardware, is also possible and contemplated.

An apparatus for information reporting is provided according to an embodiment of the present disclosure, which is applicable at a second communication node, and includes:
    a first receiving module, configured to receive a reference signal from a first communication node, to determine a reference signal-related index and/or channel state information;
    a reporting module, configured to report a set to the first communication node, wherein the set includes at least one of: the reference signal-related index and the channel state information.

An apparatus for information transmission is provided according to another embodiment of the present disclosure, which is applicable at a second communication node, and includes:
    a determining module, configured to determine reference signal resource-related information to be sent to a first communication node;

a first transmitting module, configured to transmit the related information to the first communication node.

An apparatus for information reporting is provided according to another embodiment of the present disclosure, which is applicable at a first communication node, and includes:
- a second transmitting module, configured to transmit reference information to a second communication node, wherein the second communication module determines a reference signal-related index and/or channel state information according to the reference signal;
- a second receiving module, configured to receive a set reported by the second communication node, wherein the set includes at least one of: the reference signal-related index and the channel state information.

It should be noted that each of the foregoing modules may be implemented by software or hardware. For the latter, the foregoing may be implemented by, but not limited to: providing the foregoing modules in the same processor; or, providing the foregoing modules in any combination in different processors.

Embodiment 3

A processor is provided according the embodiment of the present disclosure, for executing a program, wherein the program when executed performs any of the methods of the alternate embodiments above.

Embodiment 4

A storage medium is provided according the embodiment of the present disclosure, having a program stored thereon, wherein the program when executed performs any of the methods according to the alternate embodiments above.

It will be apparent to those skilled in the art that the various modules or steps of the present invention described above can be implemented by a general-purpose computing device, which can be centralized on a single computing device or distributed across a network of multiple computing devices. In some embodiments, they may be implemented in program code executable by a computing device such that they may be stored in a storage device for execution by the computing device and, in some cases, may differ from this. The steps shown or described are performed sequentially, or they are separately fabricated into individual integrated circuit modules, or a plurality of modules or steps thereof are fabricated as a single integrated circuit module. Thus, the invention is not limited to any specific combination of hardware and software.

The above description is only the preferred embodiment of the present invention, and is not intended to limit the present invention, and various modifications and changes can be made to the present invention. Any modifications, equivalent substitutions, improvements, etc. made within the spirit and scope of the present invention are intended to be included within the scope of the present invention.

What is claimed is:

1. A method for information transmission, comprising:
transmitting, by a second communication node, a capability of the second communication node for a Sounding Reference Signal (SRS) transmission to a first communication node, wherein the capability indicates a maximum number of sounding reference signal resources to be used simultaneously for the SRS transmission supported by the second communication node;
wherein sounding reference signal resources for the SRS transmission are organized in one or more sets, and the method further comprising:
performing, by the second communication node, the SRS transmission without simultaneously using different sounding reference signal resources in different sets.

2. The method of claim 1, wherein no more than P different reference signal resources in a set of reference signal resources are to be transmitted simultaneously, and wherein P is an integer greater than or equal to 1, the method further comprising:
notifying, by the second communication node, the first communication node of P.

3. A method for information reporting, comprising:
receiving, by a first communication node, a capability for a Sounding Reference Signal (SRS) transmission reported by a second communication node, wherein the capability indicates a maximum number of sounding reference signal resources to be used simultaneously for the SRS transmission supported by the second communication node,
wherein sounding reference signal resources for the SRS transmission are organized in one or more sets, and
wherein the second communication node performs the SRS transmission without simultaneously using different sounding reference signal resources in different sets.

4. The method of claim 3, wherein no more than P different reference signal resources in a set of reference signal resources are to be transmitted simultaneously, and wherein P is an integer greater than or equal to 1, the method further comprising:
receiving, by the first communication node, a notification of P from the second communication node.

5. An apparatus for information transmission comprising a processor configured to transmit a capability for a Sounding Reference Signal (SRS) transmission to a first communication node, wherein the capability indicates a maximum number of sounding reference signal resources to be used simultaneously for the SRS transmission supported by the apparatus,
wherein sounding reference signal resources for the SRS transmission are organized in one or more sets, and
wherein the processor is further configured to perform the SRS transmission without simultaneously using different sounding reference signal resources in different sets.

6. The apparatus of claim 5, wherein no more than P different reference signal resources in a set of reference signal resources are to be transmitted simultaneously, and wherein P is an integer greater than or equal to 1, wherein the processor is configured to notify the first communication node of P.

7. An apparatus for information reporting comprising a processor configured to receive a capability for a Sounding Reference Signal (SRS) transmission reported by a second communication node, wherein the capability indicates a maximum number of sounding reference signal resources to be used simultaneously for the SRS transmission supported by the second communication node,
wherein sounding reference signal resources for the SRS transmission are organized in one or more sets, and
wherein the second communication node performs the SRS transmission without simultaneously using different sounding reference signal resources in different sets.

8. The apparatus of claim 7, wherein no more than P different reference signal resources in a set of reference signal resources are to be transmitted simultaneously, and wherein P is an integer greater than or equal to 1, and wherein the processor is configured to receive a notification of P from the second communication node.

9. A method for information transmission, comprising:
   transmitting, by a second communication node, a capability of the second communication node for a Sounding Reference Signal (SRS) transmission to a first communication node,
   wherein the capability indicates a maximum number of reference signal resources to be used simultaneously for the SRS transmission and a maximum number of reference signal resources.

10. The method of claim 9, wherein no more than P different reference signal resources in a set of reference signal resources are to be transmitted simultaneously, and wherein P is an integer greater than or equal to 1, the method further comprising:
   notifying, by the second communication node, the first communication node of P.

11. A method for information reporting, comprising:
   receiving, by a first communication node, a capability for a Sounding Reference Signal (SRS) transmission reported by a second communication node,
   wherein the capability indicates a maximum number of reference signal resources to be used simultaneously for the SRS transmission and a maximum number of reference signal resources.

12. The method of claim 11, wherein no more than P different reference signal resources in a set are to be transmitted simultaneously, wherein P is an integer greater than or equal to 1, wherein the method further comprising:
   receiving, by the first communication node, a notification of P from the second communication node.

13. An apparatus for information transmission, comprising a processor configured to transmit a capability for a Sounding Reference Signal (SRS) transmission to a first communication node,
   wherein the capability indicates a maximum number of reference signal resources to be used simultaneously for the SRS transmission and a maximum number of reference signal resources.

14. The apparatus of claim 13, wherein no more than P different reference signal resources in a set are to be transmitted simultaneously, wherein P is an integer greater than or equal to 1, and wherein the processor is further configured to notify the first communication node of P.

15. An apparatus for information reporting, comprising a processor configured to receive a capability for a Sounding Reference Signal (SRS) transmission reported by a second communication node,
   wherein the capability indicates a maximum number of reference signal resources to be used simultaneously for the SRS transmission and a maximum number of reference signal resources.

16. The apparatus of claim 15, wherein no more than P different reference signal resources in a set are to be transmitted simultaneously, wherein P is an integer greater than or equal to 1, and wherein the processor is further configured to receive a notification of P from the second communication node.

* * * * *